(12) United States Patent
Wong et al.

(10) Patent No.: US 6,353,467 B1
(45) Date of Patent: Mar. 5, 2002

(54) ACUTE TWIST NEMATIC (ATN) LIQUID CRYSTAL DEVICE FOR OPTICAL COMMUNICATION APPLICATIONS

(75) Inventors: Charles Wong, Plano, TX (US); Yen-Chen Chen, Hsinchu (TW); Kuang-Yi Wu; Jian-Yu Liu, both of Boulder, CO (US)

(73) Assignee: Chorum Technologies Inc., TX (US)

( * ) Notice: Subject to any disclaimer, the term of this patent is extended or adjusted under 35 U.S.C. 154(b) by 0 days.

(21) Appl. No.: 09/417,600

(22) Filed: Oct. 14, 1999

Related U.S. Application Data

(62) Division of application No. 09/003,567, filed on Jan. 6, 1998, now Pat. No. 6,094,246.

(51) Int. Cl.[7] .................. G09K 19/02; G02F 1/1335
(52) U.S. Cl. ............... 349/180; 349/96; 349/99; 349/179
(58) Field of Search .................. 349/96, 99, 179, 349/180, 187

(56) References Cited

U.S. PATENT DOCUMENTS

| | | | |
|---|---|---|---|
| 3,501,640 A | 3/1970 | Harris | 250/199 |
| 4,019,807 A * | 4/1977 | Boswell et al. | 350/160 |
| 4,378,955 A * | 4/1983 | Bleha, jr. et al. | 350/334 |
| 4,461,543 A | 7/1984 | McMahon | 350/383 |
| 4,516,837 A | 5/1985 | Soref | 350/347 |
| 4,566,761 A | 1/1986 | Carlsen et al. | 350/401 |
| 4,685,773 A | 8/1987 | Carlsen et al. | 350/401 |
| 4,813,771 A | 3/1989 | Handschy et al. | 350/350 |
| 4,893,931 A | 1/1990 | Lefevre et al. | 356/351 |
| 4,896,947 A * | 1/1990 | Leenhouts | 350/347 |
| 4,952,030 A * | 8/1990 | Nakagawa et al. | 350/337 |
| 4,989,941 A | 2/1991 | Soref | 350/96.18 |
| 4,999,619 A * | 3/1991 | Te velde | 340/784 |
| 5,105,289 A * | 4/1992 | Sonehara et al. | 359/70 |
| 5,172,257 A | 12/1992 | Patel | 359/84 |
| 5,185,824 A | 2/1993 | Grimes et al. | 385/19 |
| 5,214,523 A | 5/1993 | Nito et al. | 359/100 |

(List continued on next page.)

FOREIGN PATENT DOCUMENTS

| | | | |
|---|---|---|---|
| EP | 0 811 870 A2 | 12/1997 | G02F/1/139 |
| EP | 0 905 936 A2 | 3/1999 | |
| WO | WO97/32236 | 4/1997 | |
| WO | WO 98/47254 | 10/1998 | |

OTHER PUBLICATIONS

Ouchi, Yukio, Kideo Takezoe and Atsuo Fukuda; *Switching Process in Ferroelectric Liquid Crystals: Disclination Dynamics of the Surface Stabilized States*; Japanese Journal of Applied Physics; vol. 26, No. 1; Jan. 1987, pp. 1–14.

Clark, Noel A. and Swen T. Lagerwall; *Submicrosecond bistable electro–optic switching in liquid cryastals*; Appl. Phys. Lett. 36(11) Jun. 1, 1980.

Inoue, Kyo, Norio Takato, Hiromu Toba and Masao Kawachi; *A Four–Channel Optical Waveguide Multi/Demultiplexer for 5–GHz Spaced Optical FDM Transmission*; Journal of Lightwave Technology; vol. 6, No. 2; Feb. 1988; pp. 339–345.

(List continued on next page.)

*Primary Examiner*—William L. Sikes
*Assistant Examiner*—Tarifur R. Chowdhury
(74) *Attorney, Agent, or Firm*—Sheridan Ross P.C.

(57) ABSTRACT

A twisted nematic liquid crystal-based electro-optic modulator with a twist angle between 0° and 90°, and preferably between 50° and 80° is provided. The modulator provides a relatively rapid switching time such as less than about 50 milliseconds, and provides relatively large extinction ratios, such as greater than −25 dB. Preferably the liquid crystal entrance director differs from the polarization direction by a beta angle of about 15°.

83 Claims, 9 Drawing Sheets

U.S. PATENT DOCUMENTS

| | | | |
|---|---|---|---|
| 5,257,329 A | 10/1993 | Byler et al. ................... 385/11 |
| 5,414,541 A | 5/1995 | Patel et al. ................... 359/39 |
| 5,425,115 A | 6/1995 | Wagner ........................ 385/16 |
| 5,477,350 A | 12/1995 | Riza et al. ................... 359/399 |
| 5,539,555 A | 7/1996 | Wand et al. ................. 359/100 |
| 5,555,113 A | 9/1996 | Mulkens et al. .............. 359/63 |
| 5,596,661 A | 1/1997 | Henry et al. .................. 385/24 |
| 5,606,439 A | 2/1997 | Wu ............................. 349/117 |
| 5,623,360 A | 4/1997 | Gesell et al. ............... 359/287 |
| 5,646,704 A | 7/1997 | Kodera ........................ 349/134 |
| 5,680,490 A | 10/1997 | Cohen et al. ................. 385/24 |
| 5,694,233 A | 12/1997 | Wu et al. .................... 359/117 |
| 5,712,704 A | 1/1998 | Martin et al. ............... 356/351 |
| 5,724,165 A | 3/1998 | Wu ............................. 359/117 |
| 5,726,723 A * | 3/1998 | Wang et al. ................... 349/75 |
| 5,740,288 A | 4/1998 | Pan ............................. 385/11 |
| 5,781,265 A | 7/1998 | Lee ............................ 349/171 |
| 5,809,190 A | 7/1998 | Chen ........................... 385/43 |
| 5,844,652 A | 12/1998 | Takatori ..................... 349/139 |
| 5,847,790 A | 12/1998 | Andersson et al. ......... 349/100 |
| 5,854,666 A * | 12/1998 | Fujimaki .................... 349/180 |
| 5,867,291 A | 2/1999 | Wu et al. .................... 359/117 |
| 5,870,164 A * | 2/1999 | Lu et al. ..................... 349/180 |
| 5,877,876 A | 3/1999 | Birdwell ...................... 359/39 |
| 5,905,484 A | 5/1999 | Verhulst ...................... 349/98 |
| 5,905,558 A | 5/1999 | Tokunaga et al. ........... 349/149 |
| 5,912,748 A | 6/1999 | Wu et al. .................... 359/117 |
| 5,943,151 A | 8/1999 | Grasso et al. ............... 359/117 |
| 5,946,116 A | 8/1999 | Wu et al. .................... 359/117 |
| 5,963,291 A | 10/1999 | Wu et al. .................... 349/196 |
| 5,978,116 A | 11/1999 | Wu et al. .................... 359/124 |
| 6,005,697 A | 12/1999 | Wu et al. .................... 359/117 |
| 6,067,178 A | 5/2000 | Zheng ......................... 359/124 |
| 6,094,246 A | 7/2000 | Wong et al. .................. 349/99 |
| 6,097,451 A * | 8/2000 | Palmer et al. ................ 349/14 |
| 6,111,625 A * | 8/2000 | Ohta et al. .................... 349/99 |
| 6,130,971 A | 10/2000 | Cao ............................. 385/31 |
| 6,134,358 A | 10/2000 | Wu et al. ..................... 385/16 |
| 6,137,604 A | 10/2000 | Bergano ..................... 359/124 |
| 6,137,606 A | 10/2000 | Wu et al. .................... 359/124 |
| 6,141,076 A | 10/2000 | Liu et al. .................... 349/134 |
| 6,144,494 A | 11/2000 | Shirasaki et al. ........... 359/578 |
| 6,151,158 A | 11/2000 | Takeda et al. .............. 359/341 |
| 6,166,838 A | 12/2000 | Liu et al. .................... 359/128 |
| 6,201,593 B1 | 3/2001 | Wong et al. ................ 349/180 |
| 6,208,442 B1 | 3/2001 | Liu et al. .................... 359/127 |
| 6,212,313 B1 | 4/2001 | Li ............................... 385/24 |

OTHER PUBLICATIONS

Kuznetsov, M.; *Cascaded Coupler Mach–Zehnder Channel Dropping Filters for Wavelength–Division–Multiplexed Optical Systems*; Journal of Lightwave Technology; vol. 12, No. 2; Feb. 1994; pp. 226–230.

Nosu, Kiyoshi, Hiromu Toba and Katsushi Iwashita; *Optical FDM Transmission Technique*; Journal of Lightwave Technology; vol. Lt–5, No. 9; Sep. 1987; pp. 1301–1307.

Takato, Norio; Toshimi Kominato, Akio Sugita, Kaname Jinguji; Hiromu Toba and Masao Kawachi; *Silica–Based Integrated Optic Mach*–Zehnder Multi/Demultiplexer Family with Channel Spacing of 0.01–250 nm; IEEE Journal on Selected Areas in Communications; vol. 8(6), Aug. 1990; pp. 1120–1127.

Verbeek, B.H, C.H. Henry, N.A. Olsson, K.J. Orlowsky, R.F. Kazarinov and B.H. Johnson; *Integrated Four–Channel Mach–Zehnder Multi/Demultiplexer Fabricated with Phosphorous Dopes $SiO_2$ Waveguides on Si*; Journal of Lightwave Technology; Jun. 1988; pp. 1011–1015.

Bahadur; "Liquid Crystals Applications and Uses"; vol. 3, 1992.

Carlsen et al.; "Flat Passband Birefringent Wavelength–Divison Multiplexers", Electronic Letters, vol. 23, 1987; pp. 106–107.

Fujii et al.; "Wavelength–Division Multi/Demultiplexer Utilizing Optically Active Crystals"; Journal of Lightwave Technology, vol. 8, No. 7, Jul. 1990; pp.1051–1054.

Ishio et al.; "Review and Status of Wavelength–Division–Multiplexing Technology and Its Application"; Journal of Lightwave Technology; vol. LT–2, No. 4, Aug. 1984; pp. 448–463.

Mahlein; "Fiber–Optic Communication in the Wavelength–Division Multiplex Mode"; Fiber and Integrated Optics, vol. 4, No. 4, Jun. 1982; pp. 339–372.

Melman et al; "Tunable Birefringent Wavelength–Division Multiplexer/Demultiplexer"; Electronic Letters; vol. 21, 1985; pp. 634–635.

Senior et al.; "Devices for Wavelength Multiplexing and Demultiplexing"; IEEE Proceedings, vol. 136, Pt. J, No. 3, Jun. 1989; pp. 183–202.

Madsen et al., "A General Planar Waveguide Autoregressive Optical Filter", *Journal of Lightwave Technology*, 14:3 (1996) 437–447.

C. K. Madsen, "A Multiport Frequency Band Selector with Inherently Low Loss, Flat Passbands, and Low Crosstalk", *IEEE Photonics Technology Letters*, 10:12 (1998) 1766–1768.

Chung et al., "Analysis of a Tunable Multichannel Two–Mode–Interference Wavelength Division Multiplexer/ Demultiplexer", *Journal of Lightwave Technology*,7:5 (1989) 766–777.

Liu et al., "Digitally Programmable Wavelength–Switching Technology", *IEEE/LEDS Summer Topical Meetings*August 1997, 9–10.

Madsen, "Efficient Architectures for Exactly Realizing Optical Filters with Optimum Bandpass Designs", *IEEE Photonics Technology Letters*, 10:8 (1998) 11–36–1138.

Dingel et al., "Multifunction optical filter with a Michelson–Gires–Tournois interferometer for wavelength–division–multiplexed network system application", *Optics Letters*, 23:14 (1998) 1099–1101.

Madsen et al., "Optical All–Pass Filters for Phase Response Design with Applications for Dispersion Compensation", *IEEE Photonics Technology Letters*, (1998) 994–996.

Dingel et al., "Optical wave–front transformer using the multiple–reflection interference effect inside a resonator", *Optics Letters*, 22:9 (1997) 1449–1451.

Dingel et al., "Properties of a Novel Noncascaded Type, Easy–to–Design, Ripple–Free Optical Bandpass Filter", *Journal of Lightwave Technology*, 17:8 (1999) 1461–1469.

Peng et al., "Optical implementation of regular rectangular CC–banyon network by using polarizing beam splitters", *Optics Communications*,117: (1995) 37–42.

Noguchi et al., "A Rearrangeable Multichannel Free–Space Optical Switch Based on Multistage Network Configuration", *Journal of Lightwave Technology*, 9:12 (1991) 1726–1732.

Kuroyanagi et al., "Optical Cross–Connect Architecture Using Free–Space Optical Switches Based on PI–LOSS Topology", *Fujitsu Laboratories Ltd.*, (1995) 2112–2117.

* cited by examiner

ACUTE TWIST NEMATIC (ATN) LIQUID CRYSTAL DEVICE FOR OPTICAL COMMUNICATION APPLICATIONS

This is a divisional application of prior application Ser. No. 09/003,567, filed Jan. 6, 1998, now U.S. Pat. No. 6,094,246 which is incorporated by reference.

The invention generally relates to liquid crystal devices and, in particular, spatial light modulators using twisted nematic liquid crystal materials with acute twist angles for optical communication.

BACKGROUND INFORMATION

Much of the previous work involving liquid crystal (LC) devices has been directed to display devices such as flat-panel displays. While a substantial amount of process has been made in this regard, the light modulators and other devices associated with liquid crystal display devices do not necessarily serve to solve problems in connection with optical communication applications, with which the present invention is primarily concerned. For example, although reduction in switching time has some usefulness in connection with liquid crystal display devices, this factor is of significantly greater importance in optical communication systems. The standard known as the synchronous optical network (SONET) for fiber optics communications specifies that when there is a network interruption, recovery time should be less than 50 milliseconds. Thus, in order to keep a SONET System in operation, optical switches should respond within 50 milliseconds.

One type of previous liquid crystal modulator having relatively rapid switching time is that generally described as a parallel or anti-parallel nematic liquid crystal modulator. However, parallel (or zero degree) and anti-parallel nematic LC modulators have relatively poor contrast (low extinctions ratios). In particular, due to the unidirectional molecular tilt at the cell boundaries, there is significant residual birefringence when the electrical field is applied to the cell which degrades the extinction ratio of the device. For optical communication applications, it is desired to achieve a contrast ratio or extinction coefficient of at least about −25 dB, more preferably about −30 dB, and even more preferably greater than −30 dB and up to −40 dB or more dB. Although the extinction ratio for parallel LC modulators can be improved e.g. by placement of a compensating birefringent polymer, this increases the complexity and, in most cases, the cost of the modulator (and reliability).

Another liquid crystal structure is known which provides relatively high extinction ratios by using a 90 degree twisted nematic (TN) modulator. Twisted nematic (TN) liquid crystal (LC) has been widely used in electro-optic modulators in applications such as flat panel displays, spatial light modulators, and specialized optical image processors. Such devices are generally fabricated to define twist angles of 90° (for conventional twisting TN) or 180°–270° (for "supertwist" nematic (STN) structure). In this context the twist angle is the angle between the direction of the entrance director and that of the exit director.

A typical TN-LC modulator is made by the following process. Transparent electrode indium-tin-oxide coated glass substrates are generally used for the cell walls. They are spin-coated with alignment material, such as nylon or polyimide, and then buffed, such as by rubbing with silk to define a rubbing direction for each substrate, forming LC directions. The two substrates are brought together with the rubbing directions at 90° with respect to one another (where the angles are measured in the same sense as the LC material twist, i.e. calculated in a right-handed manner when the modulator uses an LC material with right-hand twist characteristics and calculated in a left-handed manner when the modulator uses an LC material with left-hand twist characteristics). Liquid crystal molecules between the substrates are switched between two states when an electrical field is applied to the electrodes. The thickness of the liquid crystal cell is designed such that:

$$\frac{\Delta n d}{\alpha} = \frac{\lambda}{2}$$

where $\Delta n$ and $d$ are the optical birefringence and the thickness of the liquid crystal material, and $\lambda$ is the operating wavelength, and $\alpha$ is a proportionality factor for the twist angles, e.g. $\alpha=1.732$ for twist angle=90°.

Thus, the modulator acts as a switchable half-wave plate that can selectably (in response to application or non-application of the electrical field) rotate the input linear polarization by 0° or 90°. Without the electrical field, the twisted structure wave guides the polarization of the input light to rotate the polarization by 90°. With application of electrical fields, the waveguiding effect is distorted and the polarization is only partially rotated. With the modulator sandwiched between two crossed or parallel polarizers, analog intensity modulation can be obtained. In a TN geometry as described, the tilt angle of the molecules at the boundaries are perpendicular to each other. This is believed to result in substantial cancellation of the residual birefringence thus increasing contrast. Unfortunately, conventional TN modulators are inappropriate for many optical communications applications because of relatively slow response times, being nearly an order of magnitude slower than parallel nematic LC modulators.

Accordingly, previous materials and devices, while useful in many contexts, including liquid crystal displays, have not previously been configured to achieve both the high contrast and rapid switching speed desirable for optical communications applications. For example, the material known as E44 available from E. Merck Industries has a response time of about 65 milliseconds when fabricated into 90° twisted structures (e.g. for telecom applications). Such switching time can be reduced e.g. to less than about 10 milliseconds if a parallel cell is constructed but such a parallel cell does not provide the necessary contrast.

Another important factor that affects switching time is the thickness of the modulator. Switching time is roughly proportional to viscosity and inversely proportional to the square of the thickness: $t \gamma/d^2$. This would indicate that faster switching is achieved with a low material viscosity and a thinner cell. For optical communication applications operating at infrared (IR) wavelengths (e.g. about 1550 nm) in order to obtain a thin cell, a large optical birefringence (on the order of 0.26) would be needed to maintain the thickness less than about 5 microns.

Accordingly, it would be advantageous to provide a device which achieves both high contrast (such as an extinction ratio greater than about −25 to −30 dB) and rapid switching (such as a recovery time of about 50 milliseconds or less) preferably operating at infrared wavelengths and temperatures in the range of about 20° C. to 40° C.

SUMMARY OF THE INVENTION

The present invention provides a hybrid analog/binary electro-optical modulator using a twisted nematic liquid crystal structure which achieves both a high extinction ratio and rapid switching speed. The modulator is configured with the relative rubbing direction for the two cell walls or the "twist angle" neither parallel, nor at 90° or 180°–270°. Rather, the twisting angle is between 0° and 90°, preferably between about 50° and about 80°, more preferably between about 60° and about 70°, to provide an acute twist nematic (hereinafter ATN) liquid crystal device.

DETAILED DESCRIPTION OF THE PREFERRED EMBODIMENT

Figure 1A:
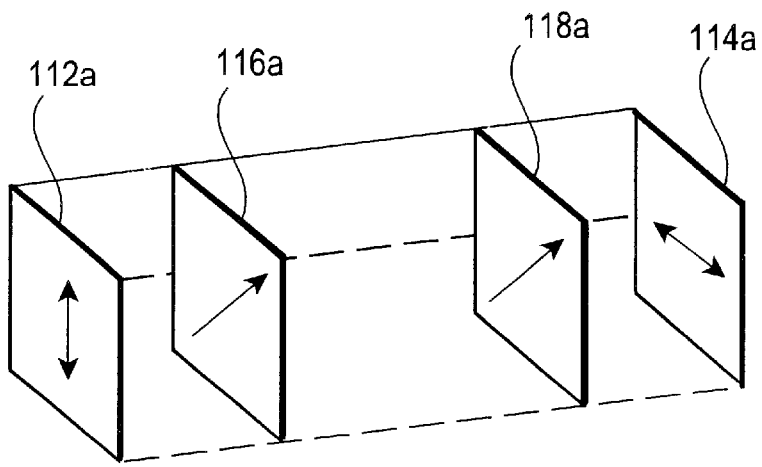
FIGS. 1A–1C are schematic exploded perspective views showing relative polarizer and buffing directions according to certain previous devices.

Before describing embodiments of the present invention, certain aspects of previous devices will first be described. As noted above, previous 0° and 90° structures commonly included entrance and exit polarizers and entrance and exit LC directors such as buffed cell walls. FIG. 1A depicts relative directions for entrance and exit polarizers 112a, 114a and entrance and exit LC directors 116a, 118a for previous parallel or 0° modulators. As can be seen from FIG. 1A, although the polarization directions of the entrance and exit polarizers 112a, 114a are crossed (i.e. orthogonal), the LC entrance and exit liquid crystal directors 116a, 118a have identical directions such that the "twist angle" is 0°. Moreover, the entrance polarizer 112a and entrance LC director 116a are 45° offset so that the angle therebetween, referred to herein as the "beta" angle, is equal to 45°.

Figure 1B:
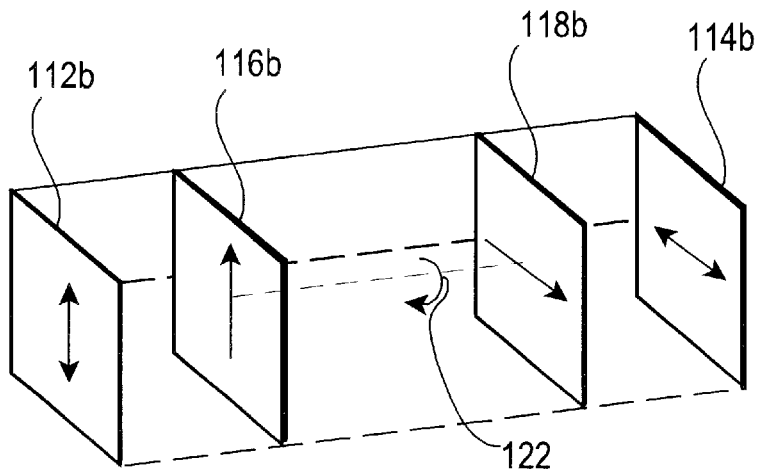

FIG. 1B depicts a structure for a 90° twisted nematic modulator according to previous devices. As with FIG. 1A, the polarizers 112b, 114b are crossed. In the configuration of FIG. 1B, the change in angular direction between the direction of the entrance LC director 116b and the exit LC director 118b (measured in a right-hand direction 122) is 90°, i.e. the configuration of FIG. 1B provides a 90° twist angle. As seen from FIG. 1B, the beta angle between the entrance polarization direction 112b and the entrance LC director 116b is 0°.

Figure 1C:
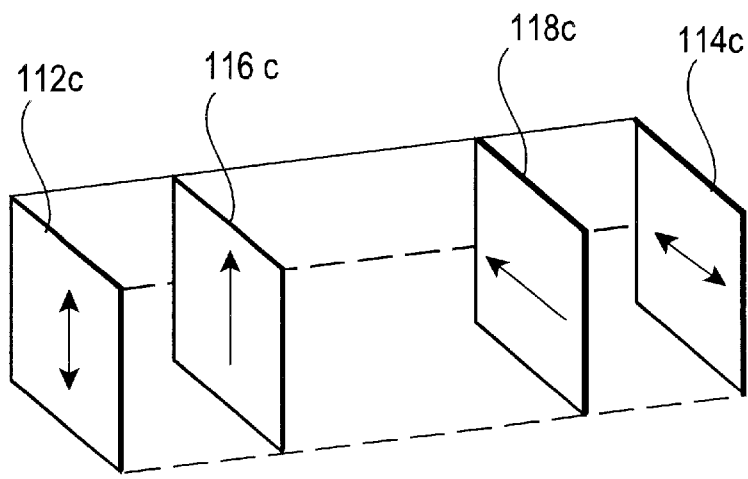

FIG. 1C depicts angles found in a 270° "supertwist" device in which the twist angle between the entrance LC director 116c and the exit LC director 118c (measured in a right-handed fashion) is 270° and the beta angle between the entrance polarizer 112c and the entrance LC director 116c is 0°.

Figure 2:
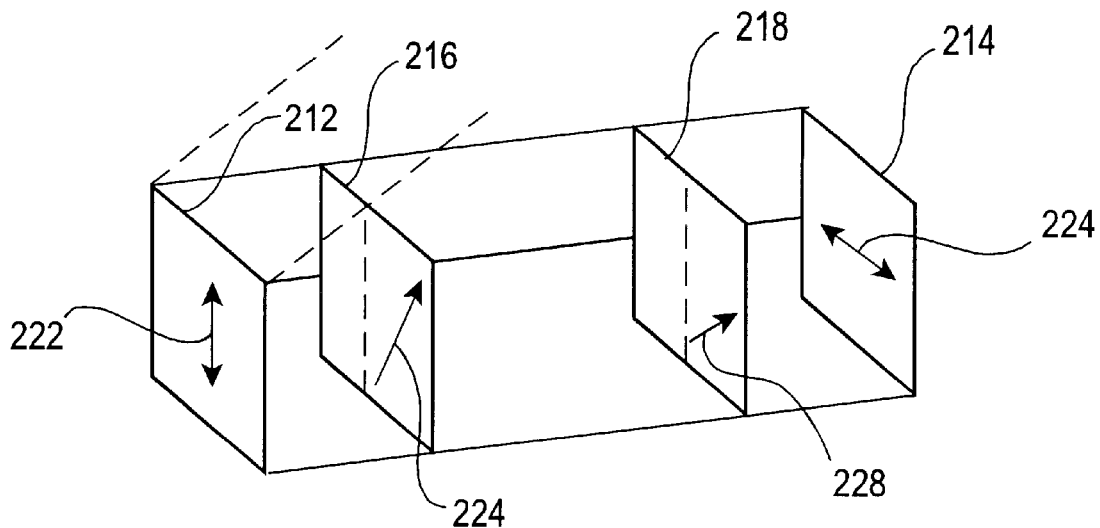
FIG. 2 is a schematic perspective exploded view of polarizer and cell wall components of a modulator according to an embodiment of the present invention showing relative polarization and buffing angles.

FIG. 2 depicts the relationship of angles in the device according to an embodiment of an ATN device of the present invention. FIG. 2 includes entrance and exit polarizers 212, 214 and entrance and exit LC directors 216, 218. In the embodiment of FIG. 2, the entrance and exit polarizers define crossed polarization directions (i.e. polarization directions 222, 224 that are orthogonal). The buffing directions or LC directions of the entrance and exit LC directors 216, 218, however, define a twist angle (i.e. the angle which is passed-through, in a right-handed fashion when moving from the angle 226 of the entrance LC director 216 to the angle 228 or buffing direction of the exit LC director) is intermediate between 0° and 90°, preferably being between about 50° and 80°, more preferably between 60° and about 70°. In the embodiment of FIG. 2, the beta angle (i.e. the angle which is passed-through, in a right-handed fashion, when going from the orientation parallel to the polarization direction 222 of the entrance polarizer 212 to the buffing direction or LC direction 226 of the LC director 216) is greater than 0°, preferably between about 0° and about +25°, more preferably between about 5° and 20°, more preferably between about 13° and about 17° for a 60° twist angle, and even more preferably, about 15°. For a 70° twist angle, the beta angle is more preferably between about 8° and about 12°, even more preferably, about 10°. According to one embodiment, it is believed superior transmission is obtained when $\beta \approx (90° - \text{twist angle})/2$. For example, in this embodiment, if the twist angle is 60°, preferably $\beta = (90° - 60°)/2 = 15°$, and if the twist angle is 70°, preferably $\beta = 10°$.

Figure 2A:
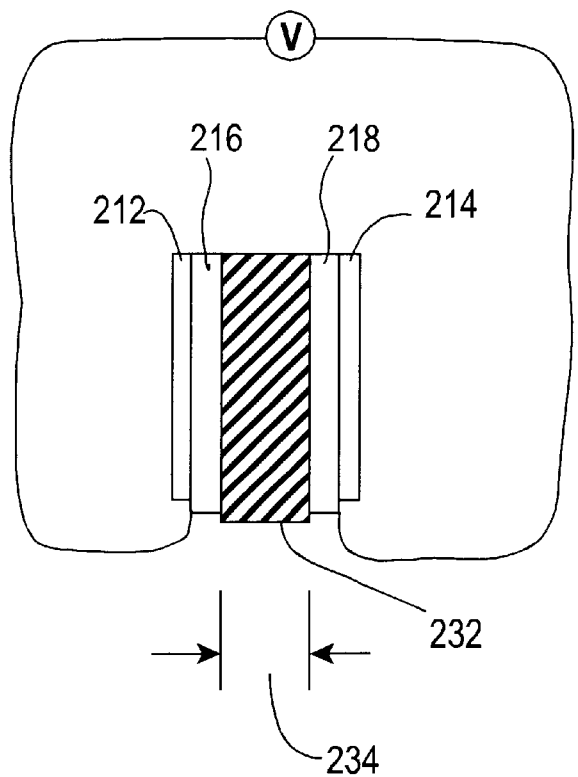

FIG. 2A is a side view of an ATN modulation device according to an embodiment of the present invention. The crossed entrance and exit polarizers 212, 214 may be made from any of a number of well known polarizing materials, one example of which is that sold under the trade name POLARIZER, sold by Newport optics of Irvine, Calif. Cell walls 216, 218 may be formed of glass coated with transparent conductive electrode material such as indium-tin-oxide coating and with nylon or polyimide layers which are buffed (e.g. with silk) to define buffing directions and positioned to define angles as depicted in FIG. 2. The cell walls with directors 216, 218 are positioned a distance apart 234 such as about 5 microns apart and the space therebetween is filled with a liquid crystal material such as, for example, that available under the trade name E44 from E.

Merck Industries of the United Kingdom. A controllable voltage source 236 of a type well known in the art is used to selectably apply voltage to the above described electrode layers to selectably switch the modulator between a substantially transmissive IR—transmissive state and an IR-extinguishing state with a extinction ration of greater than about −25 dB, preferably −30 or more dB and with a switching speed or relaxation speed of about 50 milliseconds or less.

Figure 4:
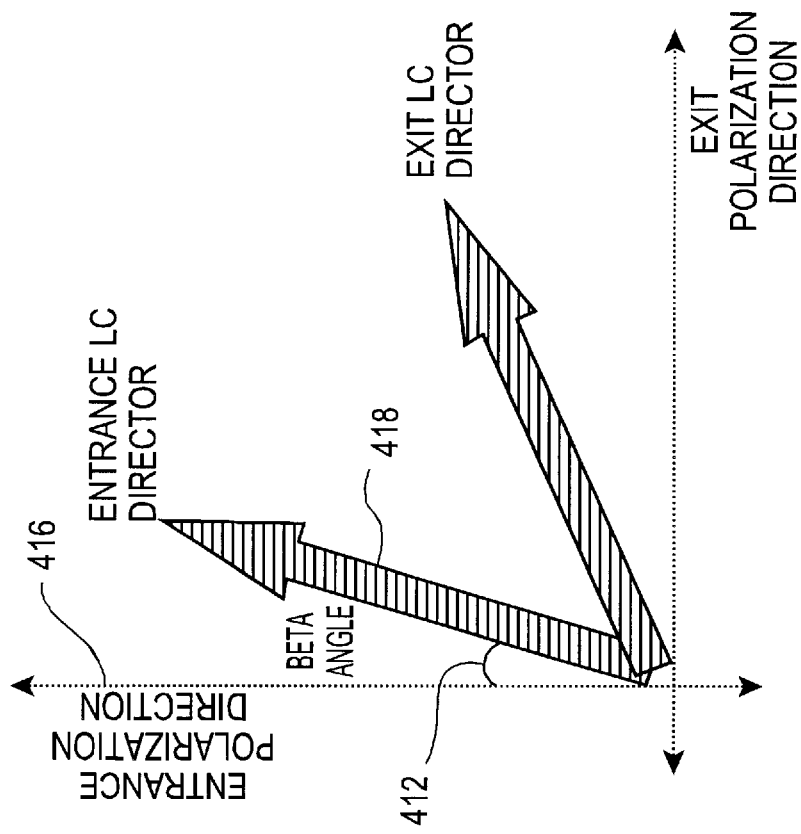
FIG. 4 is a graph depicting relative polarization directions and LC director directions for a modulator according to an embodiment of the present invention.
Figure 3:
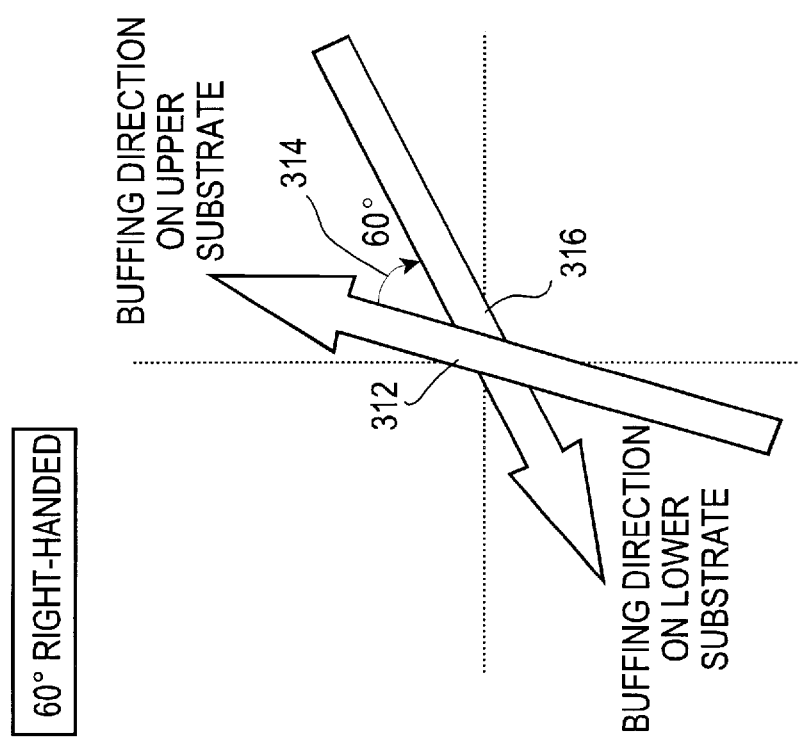
FIG. 3 is a graph depicting relative buffing directions for use in a 60° right hand twist modulator according to an embodiment of the present invention.

According to one embodiment of an ATN device as depicted in FIG. 3, the buffing direction on the upper substrate 312 defines a twist angle 314 of 60° with respect to the buffing direction 316 of the exit or lower substrate. Since the buffing directions are offset by 60° while the polarizer directions are offset by 90°, there will be an angle between the polarization directions and the entrance or exit LC directors (or, preferably, both). As depicted in FIG. 4, in one embodiment the beta angle 412 between the polarization direction 416 of the entrance polarizer and the direction 418 defined by the entrance LC director is about 15°.

Figure 5:
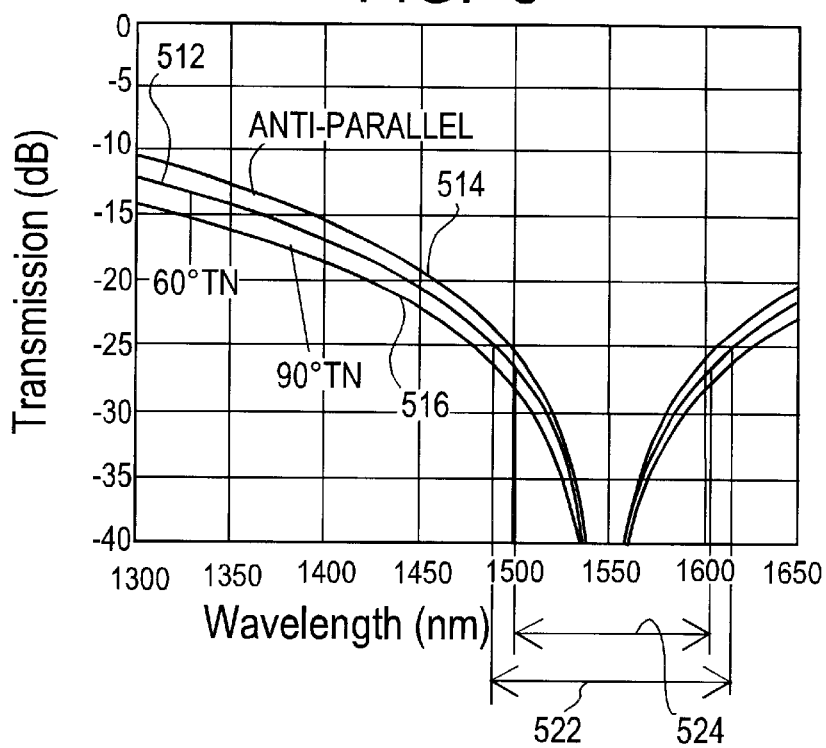
FIG. 5 is a graph comparing calculated transmission extinction ratios calculated across a range of wavelengths for anti-parallel and 90° TN modulators of previous design and a 60° TN modulator according to an embodiment of the present invention.

An ATN modulator constructed as described in connection with FIGS. 2–4 provides a transmission extinction ratio 512 across a bandwidth of light as depicted in FIG. 5 intermediate between extinction ratio typically achieved in an anti-parallel modulator 514 and that typically achieved by a 90° TN-based modulator 516. As can be seen from FIG. 5, for a given minimum or threshold extinction ratio (e.g. a minimum extinction ratio of −25 dB) the bandwidth 522 across which a 60° TN modulator according, to the present invention, is expected to operate is wider than the operating bandwidth 524 for a 0° or anti-parallel device 514.

Figure 6:
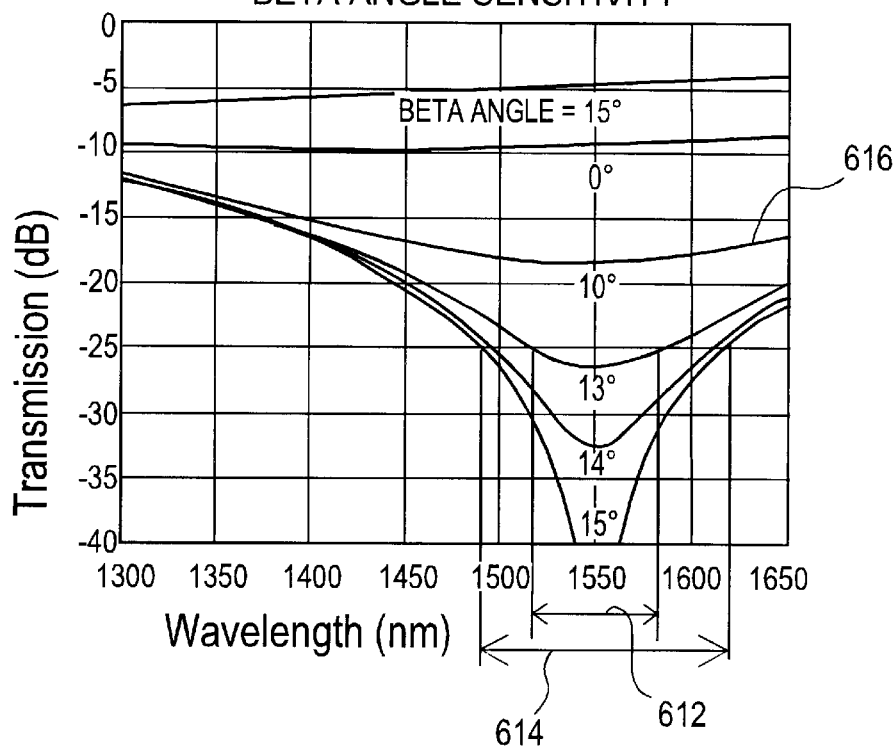
FIG. 6 is a graph depicting calculated transmission extinction ratios across a range of wavelengths for various values of beta angle.

FIG. 6 depicts the fashion in which extinction ratio is calculated to relate to the beta angle of a 60° ATN device according to an embodiment of the present invention. As seen from FIG. 6, a device with a beta angle of 13° can achieve the extinction threshold of −25 dB over a bandwidth 612 which is narrower than that 614 achieved by using a beta angle of 15°. Reducing the beta angle to 10° is expected to result in an extinction ratio 616 which never exceeds −20 dB. On the other hand, as beta angles begin to exceed about 15°, the contrast or extinction ratio achieved by the device begins to deteriorate. The calculated sensitivity to beta angles, as depicted in FIG. 6, suggests that, for a device according to embodiments of the present invention, care in fabricating devices to achieve a desirable beta angle (such as about 15°, for a 60° ATN) will be rewarded.

Figure 7A:
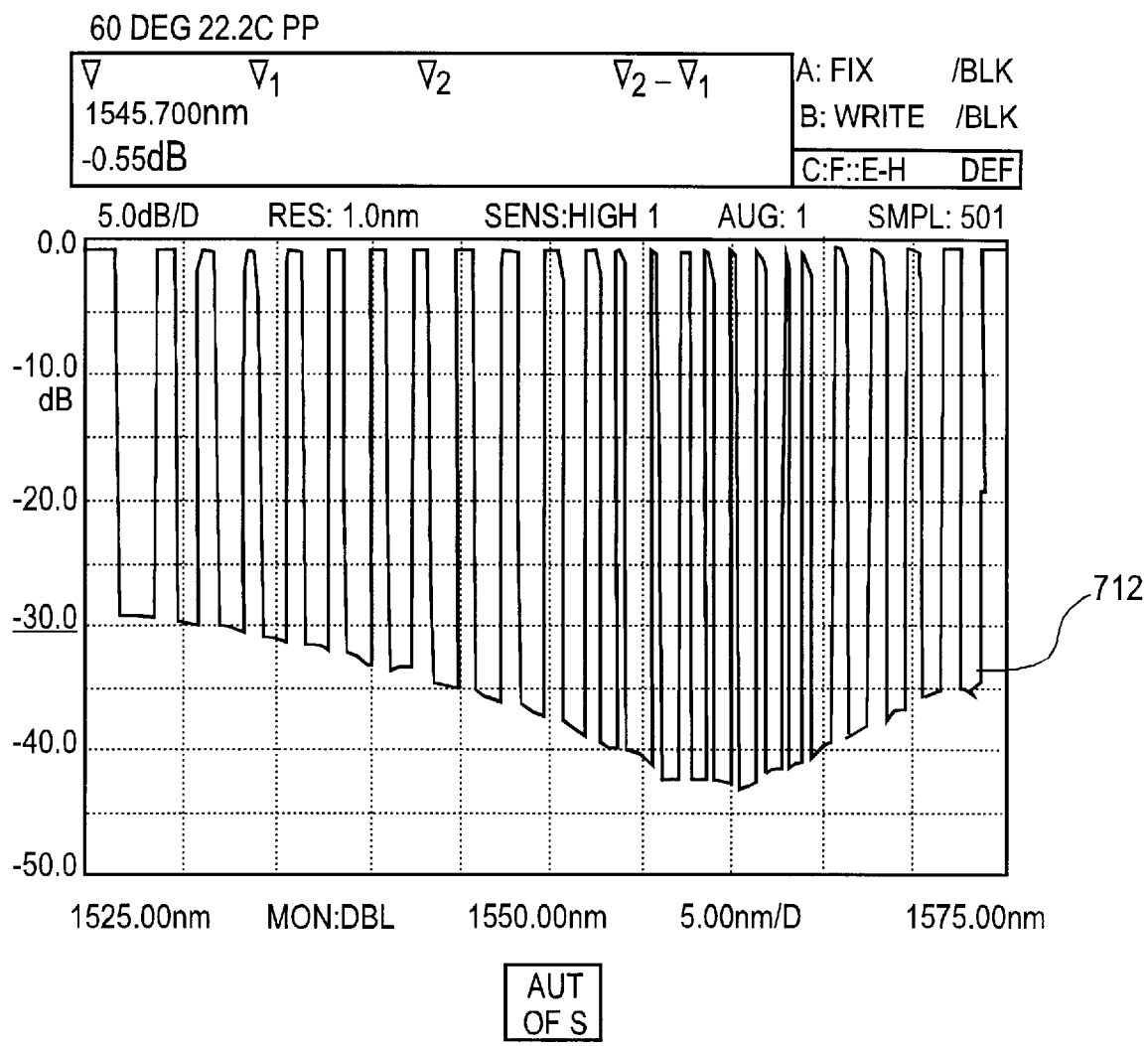
FIG. 7A depicts transmission extinction ratios for a number of wavelengths obtained using a parallel polarized modulator with 60° twist angle according to an embodiment of the present invention.

As depicted in FIG. 7A, a 60° ATN modulator according to an embodiment of the present invention configured with parallel polarizers provides an extinction ratio 712, between −30 dB and about −43 dB across a wavelength range from about 1525 nm to about 1575 nm. When a similar 60° TN device is provided with cross-polarizers according to the present invention, the extinction ratio 714 (FIG. 7B) across the same wavelength range is about −26 dB. By constructing a device in which the twist angle is increased to 70°, the extinction ratio 716 (FIG. 7C) can exceed about −30 dB 716.

Figure 7B:
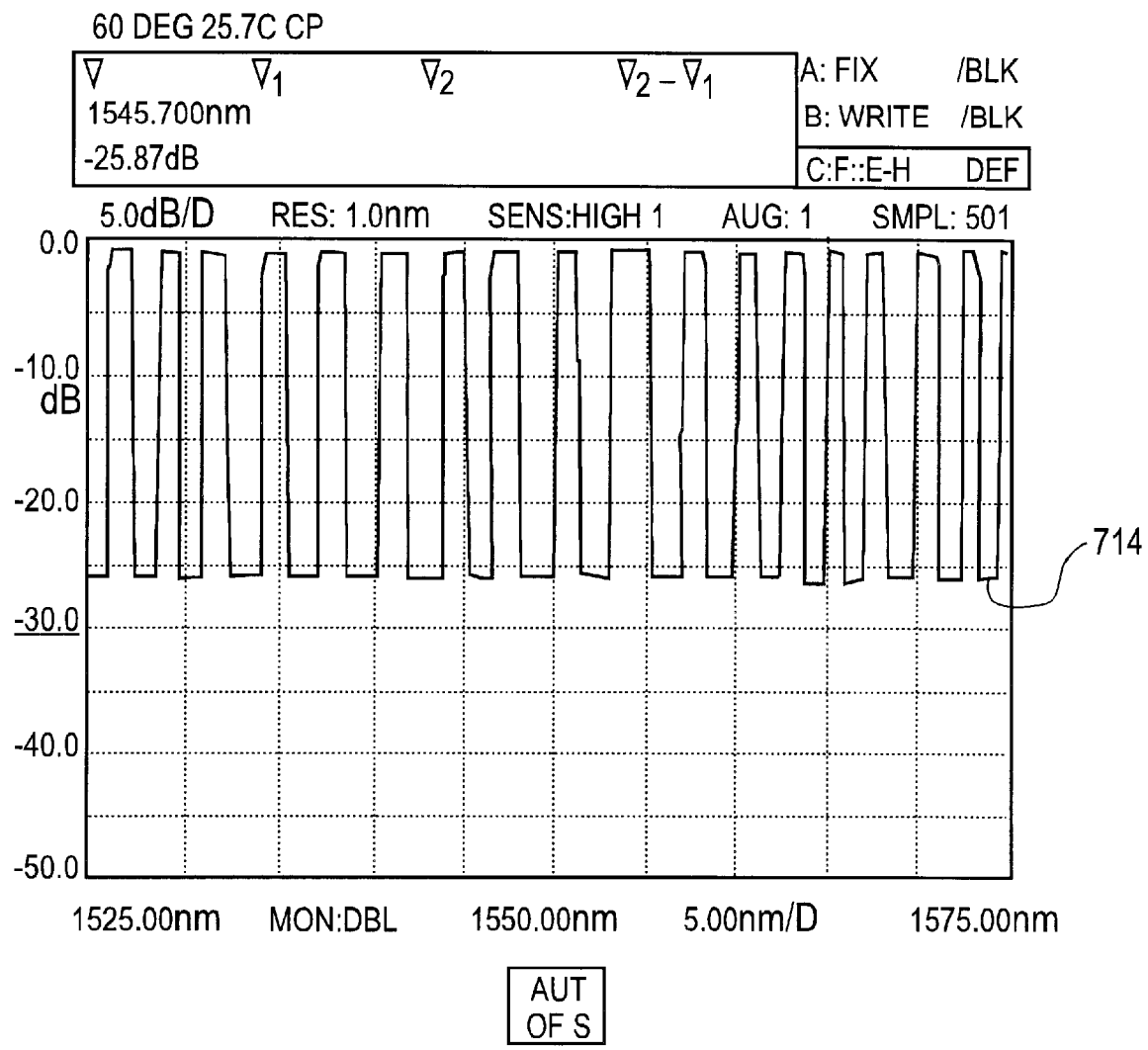
FIG. 7B is a graph corresponding to FIG. 7A but for a modulator with cross polarization.
Figure 7C:
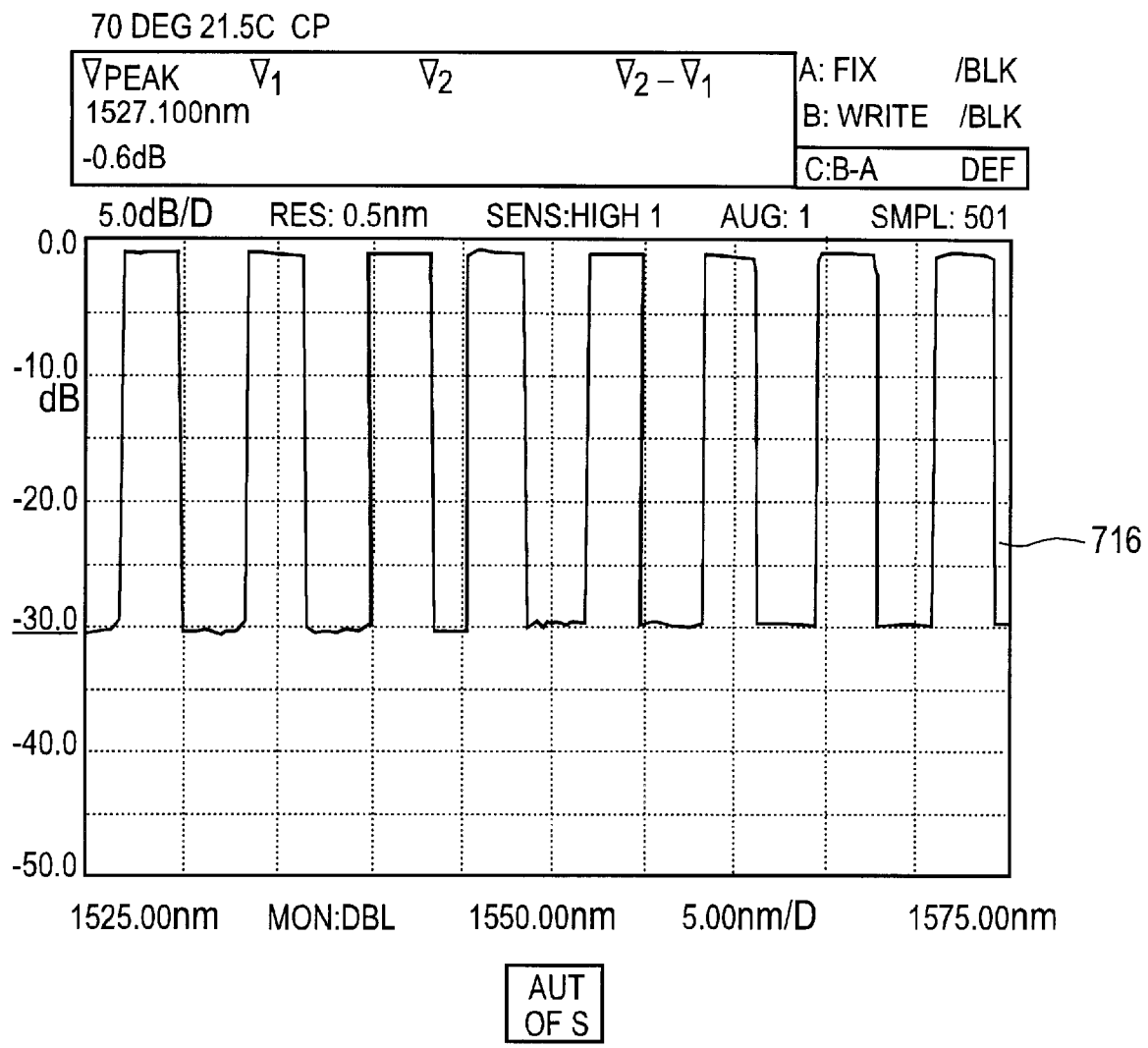
FIG. 7C is a graph corresponding to FIG. 7B but for a device with a 70° twist angle.

Thus it can be seen from FIGS. 7A–7C that an ATN device constructed according to the present invention is able to achieve an extinction ratio of greater than −25 dB as desired.

Figure 8:
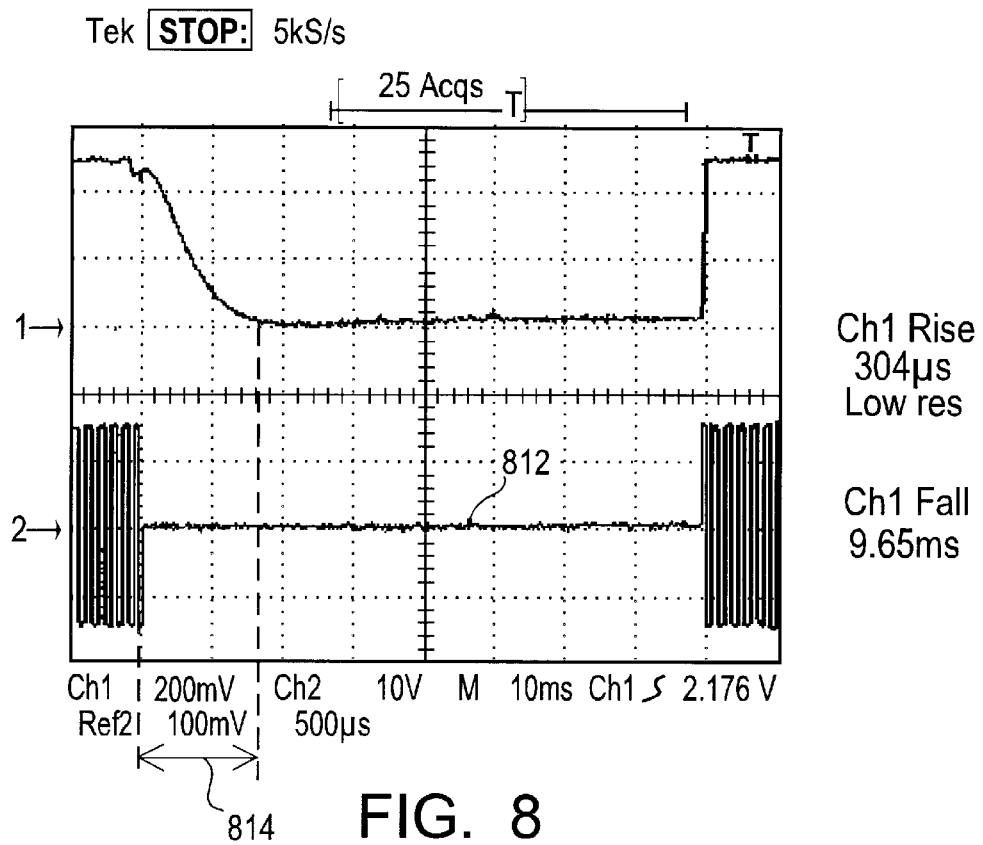
FIG. 8 is a graph depicting optical response of a 60° twisted TN modulator with parallel polarizers according to an embodiment of the present invention in response to an applied voltage signal wherein the horizontal scale is graduated in divisions of 500 milliseconds and the vertical scale for the optical response is graduated in divisions of 200 millivolts.
Figure 9:
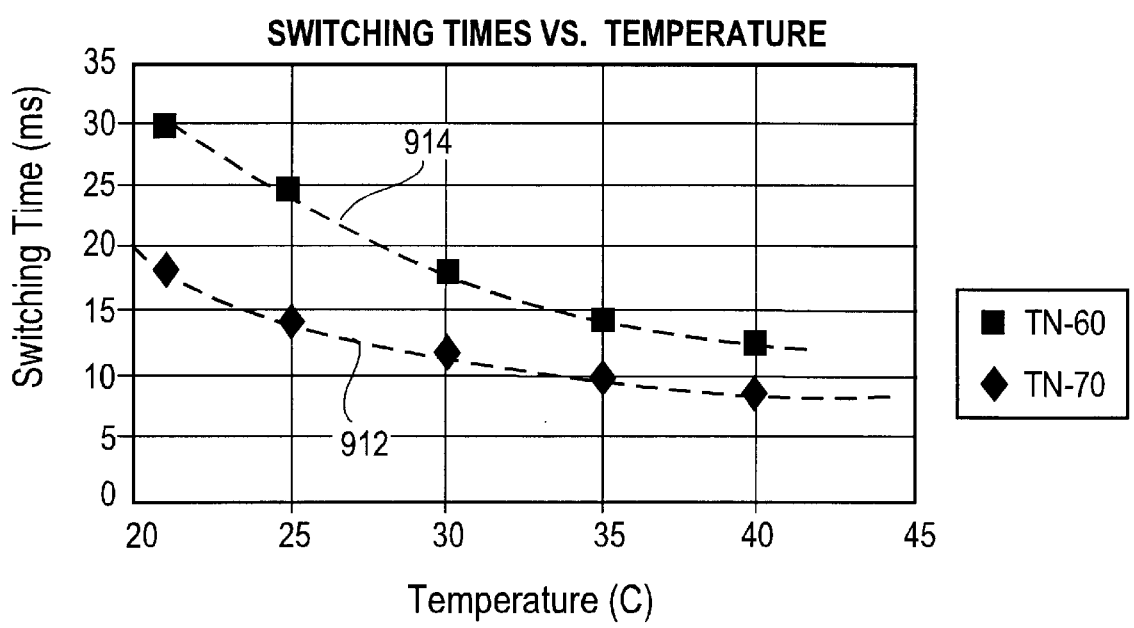
FIG. 9 shows a comparison of measured switching times for a 60° TN cell and a 70° TN cell according to an embodiment of the present invention, at different operating temperatures.

FIGS. 8 and 9 show that an ATN device according to the present invention is also able to achieve a switching time under 50 milliseconds as desired. As shown on FIG. 8, when a change is made in an applied voltage 812, a 60° ATN cell with parallel polarizers according to the present invention is able to achieve a desired optical response within a time period 814 of about 10 milliseconds at 40° C. As shown in FIG. 9, switching time for both a 60° twist angle ATN modulator 912 and a 70° twist angle ATN modulator 914 is expected to display some temperature dependence with both embodiments expected to achieve switching times less than 50 milliseconds, preferably less than 35 milliseconds across a temperature range between 20° C. and 45° C.

Figure 10:
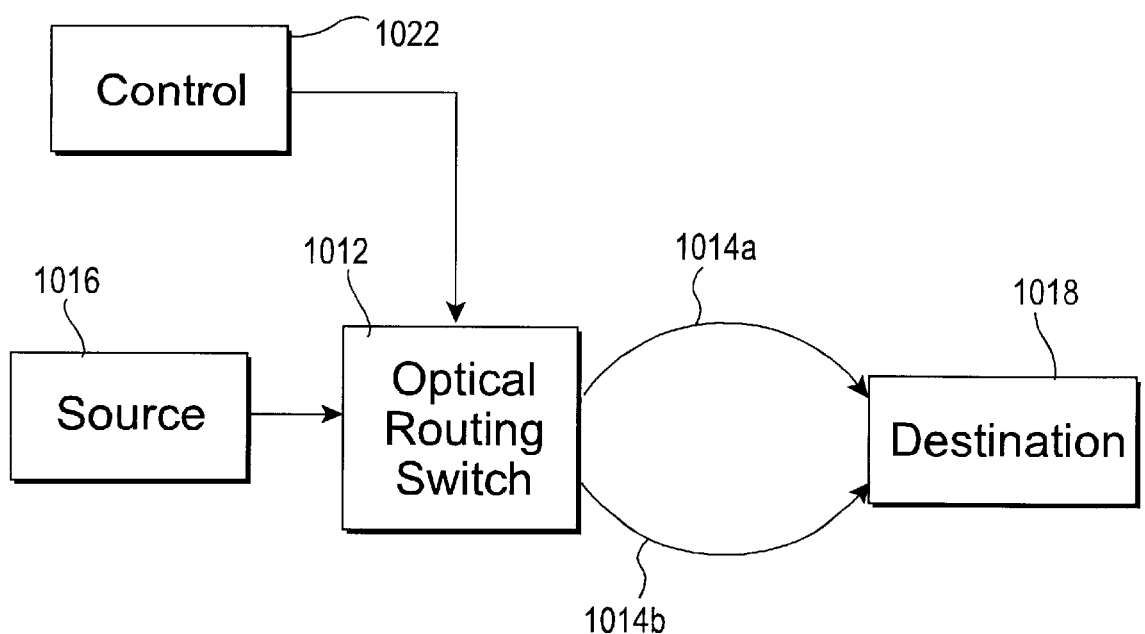
FIG. 10 shows a simplified diagram of optical telecommunication system using ATN modulator of the present invention.

ATN modulators as described above may, according to one embodiment of the present invention, be used in optical telecommunications systems. As depicted in the simplified diagram of FIG. 10, an optical network may use a modulator as described above as part of an optical routing switch 1012 in selecting among paths e.g. 1014*a*, 1014*b* between a signal source 1016 and destination 1018. By providing modulators having relatively high extinction ratios, a favorable signal-to-noise ratio in the switch component 1012 for an optical network can be realized. By providing modulators which also achieve relatively high switching rates, it is possible to provide substantially uninterrupted service from the source 1016 to the destination 1018 by permitting a control 1022 to rapidly reconfigure the optical routing switch 1012 e.g. in response to a interruption on one of the paths (e.g. when an optical fiber is cut).

In light of the above description, a number of advantages of the present invention can be seen. The invention provides a useful and feasible hybrid analog/binary electro-optic modulator using twisted nematic liquid crystal structure. The present invention provides for an ATN electro-optic modulator which can simultaneously provide both a high extinction ratio (such as greater than −25 dB) and rapid switching (such as less than 50-microsecond switching). Such simultaneous high extinction ratio and rapid switching speeds, while believed to be of little interest in connection with display devices, are of relatively great benefit in the context of optical communication application such as optical modulators for optical routing switches in a fiber-optic or other optical communication network.

A number of variations and modifications of the invention can also be used. Although examples of liquid crystal and polarization materials that can be used in the context of the present invention have been described, other materials are also operable. Although the invention has been described in the context of optical routing switches, ATN devices according to the present invention can also be applied to, e.g. display devices and high-speed spatial light modulators (SLMs). In general, the 60° twist embodiment has a more rapid switching time than the 70° twist embodiment, as seen in FIG. 9, while the 70° twist embodiment has an extinction ratio that is about 5 dB larger than that of a corresponding 60° twist embodiment.

Although the invention has been described by way of a preferred embodiment and certain variations and modifications, other variations and modifications can also be used, the invention being defined by the following claims.

What is claimed is:

1. A method for liquid crystal electro-optic modulation comprising:
   providing first and second spaced apart cell walls wherein said first and second cell walls are configured to respectively define first and second liquid crystal director directions, said first and second liquid crystal director directions being angularly offset by an amount defining a twist angle, wherein said twist angle is greater than 0 degrees and less than 90 degrees;
   positioning a liquid crystal material between said first and second spaced apart cell walls;

positioning separate entrance and exit polarizers respectively to define entrance and exit polarization directions;

transmitting light through said entrance and exit polarizers, said at least first and second cell walls, and said liquid crystal material to provide a first output light intensity;

applying an electric potential across said liquid crystal material to switch, within a switching time of less than about 50 milliseconds, to a state in which transmission of said light is substantially prevented to provide an extinction ratio, with respect to said first output light intensity, of at least about −25 dB.

2. A method, as claimed in claim 1, wherein said switching time is less than about 35 milliseconds.

3. A method, as claimed in claim 1, wherein said extinction ratio is at least about −30 dB.

4. A method, as claimed in claim 1 wherein said twist angle is between about 50 degrees and about 80 degrees.

5. A method, as claimed in claim 1 wherein said twist angle is between about 60 degrees and about 70 degrees.

6. A method, as claimed in claim 1, further comprising positioning entrance and exit polarizers respectively to define entrance and exit polarization directions.

7. A method, as claimed in claim 1 wherein said entrance and exit polarization directions are substantially crossed.

8. A method, as claimed in claim 1, further comprising positioning said first cell wall such that said entrance polarization direction said entrance polarizer and said first liquid crystal director direction are angularly offset by an amount defining a beta angle, wherein said beta angle is between about 5 degrees and about 20 degrees.

9. A method, as claimed in claim 8, wherein the beta angle is determined by the following equation:

Beta angle=(90°−twist angle)/2.

10. A method, as claimed in claim 9, wherein said beta angle is between about 13 degrees and about 15 degrees.

11. A method, as claimed in claim 1, further comprising positioning said first cell wall such that said entrance polarization direction of said entrance polarizer and said first liquid crystal director direction are angularly offset by about half the difference between 90° degrees and said twist angle.

12. A method for liquid crystal electro-optic modulation comprising:

transmitting light through at least first and second spaced apart cell walls, separate entrance and exit polarizers, and a liquid crystal material positioned between the first and second spaced apart cell walls to provide a first output light intensity, wherein said first and second cell walls are configured to respectively define first and second liquid crystal director directions and said entrance and exit polarizers are configured to respectively define entrance and exit polarization directions, said first and second liquid crystal director directions being angularly offset by an amount defining a twist angle, wherein said twist angle is greater than 0 degrees and less than 90 degrees; and applying an electric potential across said liquid crystal material to switch, within a switching time of less than about 50 milliseconds, to a state in which transmission of said light is substantially prevented to provide an extinction ratio, with respect to said first output light intensity, of at least about −25 dB.

13. A method, as claimed in claim 12, wherein said switching time is less than about 35 milliseconds.

14. A method, as claimed in claim 12, wherein said extinction ratio is at least about −30 dB.

15. A method, as claimed in claim 12 wherein said twist angle is between about 50 degrees and about 80 degrees.

16. A method, as claimed in claim 12, wherein said twist angle is between about 60 degrees and about 70 degrees.

17. A method, as claimed in claim 12 wherein said entrance and exit polarization directions are substantially parallel.

18. A method, as claimed in claim 12 wherein said entrance and exit polarization directions are substantially crossed.

19. A method, as claimed in claim 12 wherein said first cell wall is positioned such that said entrance polarization direction of said entrance polarizer and said first liquid crystal director direction are angularly offset by an amount defining a beta angle, wherein said beta angle is between about 5 degrees and about 20 degrees.

20. A method, as claimed in claim 19, wherein the beta angle is determined by the following equation:

Beta angle=(90°−twist angle)/2.

21. A method, as claimed in claim 20, wherein said beta angle is between about 13 degrees and about 15 degrees.

22. A method, as claimed in claim 12, wherein said first cell wall is positioned such that said entrance polarization direction of said entrance polarizer and said first liquid crystal director direction are angularly offset by about half the difference between 90° and said twist angle.

23. A method of liquid crystal electro-optic modulation, comprising:

transmitting light through a liquid crystal material and separate entrance and exit polarizers to provide a first output light intensity, the entrance and exit polarizers respectively defining entrance and exit polarization directions; and applying an electric potential across said liquid crystal material to switch, within a switching time of less than about 50 milliseconds, to a state in which transmission of said light through said liquid crystal material is at least substantially is at least substantially prevented to provide an extinction ratio, with respect to said first output light intensity, of at least about −25 dB.

24. A method, as claimed in claim 23, further comprising:

passing, before the transmitting step, the light through a first cell wall, said first cell wall configured to define a first liquid crystal director direction; and passing, after the transmitting step, the light through a second cell wall, said second cell wall configured to define a second liquid crystal director direction, wherein said first and second liquid crystal director directions are angularly offset by an amount defining a twist angle.

25. A method, as claimed in claim 24, wherein said twist angle is greater than 0 degrees and less than 90 degrees.

26. A method, as claimed in claim 24, wherein said twist angle is between about 50 degrees and about 80 degrees.

27. A method, as claimed in claim 24, wherein said twist angle is between about 60 degrees and about 70 degrees.

28. A method, as claimed in claim 24, further comprising positioning said first cell wall such that said entrance polarization direction of said entrance polarizer and said first liquid crystal director direction are angularly offset by an amount defining a beta angle, wherein said beta angle is between about 5 degrees and about 20 degrees.

29. A method, as claimed in claim 28, wherein the beta angle is determined by the following equation:

Beta angle=(90° −twist angle)/2.

30. A method, as claimed in claim 28, wherein said beta angle is between about 13 degrees and about 15 degrees.

31. A method, as claimed in claim 23, wherein said switching time is less than about 35 milliseconds.

32. A method, as claimed in claim 23, wherein said extinction ratio is at least about −30 dB.

33. A method, as claimed in claim 23, wherein said entrance and exit polarization directions are substantially parallel.

34. A method, as claimed in claim 23, wherein said entrance and exit polarization directions are substantially crossed.

35. A method, as claimed in claim 23, further comprising positioning said first cell wall such that said entrance polarization direction of said entrance polarizer and said first liquid crystal director direction are angularly offset by about half the difference between 90 degrees and said twist angle.

36. A method, as claimed in claim 23, further comprising:
providing optical transmission media defining at least first and second optical transmission paths between a signal source and a signal destination, wherein said liquid crystal material is a part of at least a first routing switch coupled to said optical transmission media to switch between said first and second optical transmission paths.

37. A method, as claimed in claim 36, wherein, when said applying step is performed, the light is routed to the first optical transmission path and when said applying step in not performed, the light is routed to the second optical transmission path.

38. A method for liquid crystal electro-optic modulation, comprising:
passing light through an entrance polarizer and a first cell wall, said entrance polarizer configured to define an entrance polarization direction and said first cell wall configured to define a first liquid crystal director direction;
passing light through a liquid crystal material to provide a first output light intensity;
applying an electric potential across said liquid crystal material to switch, within a switching time of less than about 50 milliseconds, to a state in which passage of at least a portion of said light through said liquid crystal material is blocked; and
passing the light through a second cell wall and an exit polarizer separate from said entrance polarizer, said second wall configured to define a second liquid crystal director direction and said exit polarizer configured to define an exit polarization direction, wherein said first and second liquid crystal director directions are angularly offset by an amount defining a twist angle and said twist angle is greater than 0 degrees and less than 90 degrees.

39. A method, as claimed in claim 38, wherein the state in which passage of said at least a portion of light is blocked defines an extinction ratio, with respect to said first output light intensity, of at least about −25 dB.

40. A method, as claimed in claim 39, wherein said extinction ration is at least about −30 dB.

41. A method, as claimed in claim 38, wherein said switching time is less than about 35 milliseconds.

42. A method, as claimed in claim 38, wherein said twist angle is between about 50 degrees and about 80 degrees.

43. A method, as claimed in claim 38, wherein said twist angle is between about 60 degrees and about 70 degrees.

44. A method, as claimed in claim 38, wherein said entrance and exit polarization directions are substantially parallel.

45. A method, as claimed in claim 38, wherein said entrance and exit polarization directions are substantially crossed.

46. A method, as claimed in claim 38 further comprising positioning said first cell wall such that said entrance polarization direction of said entrance polarizer and the first liquid crystal director direction are angularly offset by an amount defining a beta angle, wherein said beta angle is between about 5 degrees and about 20 degrees.

47. A method, as claimed in claim 46, wherein the beta angle is determined by the following equation:

Beta angle=(90° −twist angle)/2.

48. A method, as claimed in claim 46, wherein said beta angle is between about 13 degrees and about 15 degrees.

49. A method, as claimed in claim 38, further comprising positioning said first cell wall such that said entrance polarization direction of said entrance polarizer and said first liquid crystal director direction are angularly offset by about half the difference between 90 degrees and said twist angle.

50. A method, as claimed in claim 38, further comprising:
providing optical transmission media defining at least first and second optical transmission paths between a signal source and a signal destination, wherein said liquid crystal material and first and second cell walls are a part of at least a first routing switch coupled to said optical transmission media to switch between said first and second optical transmission paths.

51. A method, as claimed in claim 50, wherein, when said applying step is performed, the light is routed to the first optical transmission path and when said applying step is not performed, the light is routed to the second optical transmission path.

52. A twisted nematic liquid crystal electro-optic modulator, comprising:
separate entrance and exit polarizers respectively defining entrance and exit polarization directions;
first and second spaced apart cell walls;
a liquid crystal material positioned between said first and second spaced apart cell walls;
electrodes positioned to impose an electric potential across said liquid crystal material; and
a power source connected to said electrodes for applying the electric potential across said liquid crystal material to switch, with a switching time of less than about 50 milliseconds, to a state in which transmission of at least a portion of said light through said liquid crystal material is blocked;
wherein said first and second spaced apart cell walls are configured to respectively define first and second liquid crystal director directions, said first and second liquid crystal director directories being angularly offset by an amount defining a twist angle, wherein said twist angle is greater than 0 degrees and less the 90 degrees.

53. A modulator, as claimed in claim 52, wherein said twist angle is between about 50 degrees and about 80 degrees.

54. A modulator, as claimed in claim 52, wherein said twist angle is between about 60 degrees and about 70 degrees.

55. A modulator, as claimed in claim 52, wherein said entrance and exit polarization directions are substantially parallel.

56. A modulator, as claimed in claim 52, wherein said entrance and exit polarization directions are substantially crossed.

57. A modulator, as claimed in claim 52, wherein said polarization direction of said entrance polarizer and said first liquid crystal director direction is angularly offset by an amount defining a beta angle, wherein said beta angle is between about 5 degrees and about 20 degrees.

58. A modulator, as claimed in claim 57, wherein the beta angle is determined by the following equation:

Beta angle=(90° −twist angle)/2.

59. A modulator, as claimed in claim 57, wherein said beta angle is between about 13 degrees about 17 degrees.

60. A twisted nematic liquid crystal electro-optic modulator, comprising:

separate entrance and exit polarizer means respectively defining entrance and exit polarization directions;

first and second spaced apart walls means configured to respectively define first and second liquid crystal director directions;

a liquid crystal material positioned between said first and second spaced apart walls means;

electrode means for applying an electric potential across said liquid crystal material; and source means for energizing the electrode means to apply the electric potential across said liquid crystal material to switch, within a switching time of less than about 50 milliseconds, to a state in which transmission of said light through said liquid crystal material is at least substantially prevented to provide an extinction ration, with respect to said first output light intensity, of at least about −25 dB.

61. A modulator, as claimed in claim 60, wherein said twist angle is between 0 degrees and 90 degrees.

62. A modulator, as claimed in claim 60, wherein said twist angle is between about 50 degrees and about 80 degrees.

63. A modulator, as claimed in claim 60, wherein the beta angle is determined by the following equation:

Beta angle=(90° −twist angle)/2.

64. A modulator, as claimed in claim 60, wherein said entrance and exit polarization directions are substantially parallel.

65. A modulator, as claimed in claim 60, wherein said entrance and exit polarization directions are substantially crossed.

66. A modulator, as claimed in claim 60, wherein said polarization direction of said entrance polarizer means and said first liquid crystal director direction are angularly offset by an amount defining a beta angle, wherein said beta angle is between about 5 degrees and about 20 degrees.

67. A modulator, as claimed in claim 66, wherein said beta angle is between about 13 degrees and about 17 degrees.

68. An optical communication system, comprising:

at least a first optical component operable to generate an optical signal;

at least a second optical component operable to receive an optical signal;

at least a first routing switch coupled to said first and second optical components; includes:

separate entrance and exit polarizers respectively defining entrance and exit polarization directions;

first and second spaced apart cell walls;

a liquid crystal material positioned between said first and second spaced apart cell walls;

electrodes positioned to impose an electrical potential across said liquid crystal material;

wherein said first and second space apart cell walls are configured to respectively define first and second liquid crystal director directions, said first and second liquid crystal director directions being angularly offset by an amount defining a twist angle, wherein said twist angle is greater than 0 degrees and less than 90 degrees, wherein said at least a first routing switch has a switching time of less than about 50 milliseconds.

69. A system, as claimed in claim 68, wherein said twist angle is between about 50 degrees and about 80 degrees.

70. A system, as claimed in claim 68, wherein said twist angle is between about 60 degrees and about 70 degrees.

71. A system, as claimed in claim 68, wherein said entrance and exit polarization directions are substantially crossed.

72. A system, as claimed in claim 68, wherein said entrance and exit polarization directions are substantially parallel.

73. A system, as claimed in claim 68, wherein said polarization direction of said entrance polarizer and said first liquid crystal director direction are angularly offset by an amount defining a beta angle, wherein said beta angle is between about 5 degrees and about 20 degrees.

74. A system, as claimed in claim 73, wherein the beta angle is determined by the following equation:

Beta angle=(90° −twist angle)/2.

75. A system, as claimed in claim 73, wherein said beta angle is between about 13 degrees and about 17 degrees.

76. An optical communication system, comprising:

at least a first optical component operable to generate an optical signal;

at least a second optical component operable to receive the optical signal;

at least a first routing switch coupled to said first and second optical components;

said first routing switch including at least a first electro-optical modulator which includes:

separate entrance and exit polarizers respectively defining entrance and exit polarization directions;

first and second spaced apart cell walls;

a liquid crystal material positioned between said first and second spaced apart cell walls, the liquid crystal material being configured to transmit the optical signal to provide a first output light intensity; and electrodes positioned to impose an electrical potential across said liquid crystal material to a state in which in which transmission of at least a portion of the optical signal through the liquid crystal material is blocked to provide an extinction ration, with respect to the first output light intensity light intensity, of at least about −25 dB, wherein said at least a first routing switch has a switching time of less than about 50 milliseconds.

77. A system, as claimed in claim 76, wherein said first and second spaced apart cell walls are configured to respectively define first and second liquid crystal director directions, said first and second liquid crystal director directions being angularly offset by an amount defining a twist angle, wherein said twist angle is greater the 0 degrees and less than 90 degrees.

78. A system, as claimed in claim 77, wherein said twist angle is between about 50 degrees and about 80 degrees.

79. A system, as claimed in claim 76, wherein said entrance and exit polarization directions are substantially parallel.

80. A system, as claimed in claim 76, wherein said entrance and exit polarization directions are substantially crossed.

81. A system, as claimed in claim 76, wherein said polarization direction of said entrance polarizer and said first liquid crystal director direction are angularly offset by an amount defining a beta angle, wherein said beta angle is between about 5 degrees and about 20 degrees.

82. A system, as claimed in claim 81, wherein the beta angle is determined by the following equation:

$$\text{Beta angle} = (90° - \text{twist angle})/2.$$

83. A system, as claimed in claim 81, wherein said beta angle is between about 13 degrees and about 17 degrees.

* * * * *